United States Patent
Cole et al.

(10) Patent No.: US 7,456,412 B2
(45) Date of Patent: Nov. 25, 2008

(54) INSULATOR FOR TUBE HAVING CONDUCTIVE CASE

(75) Inventors: Barrett E. Cole, Bloomington, MN (US); Khanh Q. Nguyen, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/786,178

(22) Filed: Apr. 11, 2007

(65) Prior Publication Data

US 2008/0252467 A1    Oct. 16, 2008

(51) Int. Cl.
*G01N 23/12* (2006.01)

(52) U.S. Cl. .................................... 250/429
(58) Field of Classification Search ............. 250/372; 313/523, 539, 542, 544
See application file for complete search history.

(56) References Cited

U.S. PATENT DOCUMENTS

| | | | |
|---|---|---|---|
| 2,587,589 A | 3/1952 | Bordewieck | |
| 2,978,603 A * | 4/1961 | Fite et al. | 313/93 |
| 3,551,841 A | 12/1970 | Harrick | |
| 3,567,948 A | 3/1971 | Oke et al. | |
| 5,446,529 A | 8/1995 | Stettner et al. | |
| 5,498,926 A | 3/1996 | Kyushima et al. | |
| 5,504,386 A | 4/1996 | Kyushima et al. | |
| 5,864,207 A | 1/1999 | Kume et al. | |
| 5,959,301 A * | 9/1999 | Warashina | 250/372 |
| 6,700,496 B2 * | 3/2004 | Francke et al. | 340/578 |
| 6,835,922 B1 | 12/2004 | Shimoi et al. | |
| 6,946,641 B1 | 9/2005 | Shimoi et al. | |
| 7,132,639 B2 | 11/2006 | Shimoi et al. | |
| 7,135,670 B2 | 11/2006 | Shimoi et al. | |
| 7,148,461 B2 | 12/2006 | Shimoi et al. | |
| 2004/0135094 A1 | 7/2004 | Niigaki et al. | |

* cited by examiner

*Primary Examiner*—David P. Porta
*Assistant Examiner*—Kiho Kim
(74) *Attorney, Agent, or Firm*—Kris T. Fredrick

(57) ABSTRACT

One embodiment includes an electromagnetic sensor which includes a header, an anode connected to a first terminal extending through the header, the anode in electrical isolation from the header, a cathode connected to a second terminal extending through the header, the cathode in electrical isolation from the header, a conductive case including a window transparent to electromagnetic energy, the conductive case enclosing the anode and the cathode and hermetically sealed to the header and an insulative sleeve disposed between the anode and the case and between the cathode and the conductive case.

20 Claims, 5 Drawing Sheets

INSULATOR FOR TUBE HAVING CONDUCTIVE CASE

BACKGROUND

Various sensors are known in which electromagnetic photons are detected by inducing a change in current between a cathode and an anode. Such devices are useful in applications including, but not limited to, flame detection. Some flame detectors, for instance, detect photons and produce a current between an anode and a cathode responsive to such detected photons.

In some applications, the cathode and the anode are packaged in a metallic case. There are several problems with such packaging. One problem is that such a case can interfere with the functioning of the sensor. One way a case can interfere with a sensor is by altering a path between the cathode of the sensor and the anode of the sensor. Such interferences can lead to a decrease in signal fidelity, can upset calibration, and can cause additional operational problems. There is therefore a need to provide a lower cost, robust case which is useful in a wide range of applications and which meets fidelity requirements, calibration precision requirements and/or other operational requirements.

DETAILED DESCRIPTION

Figure 1:
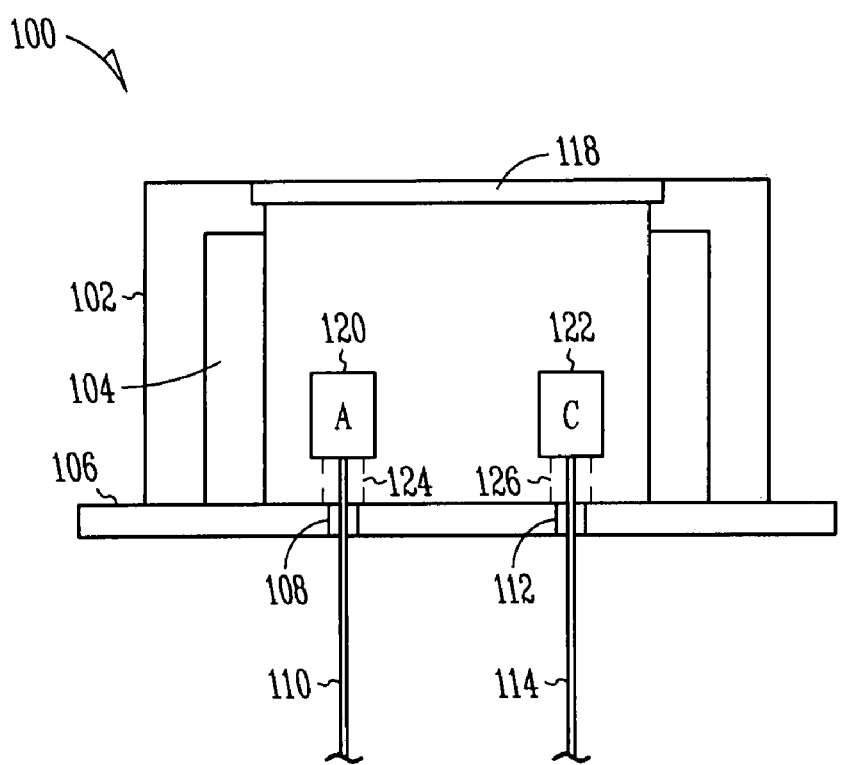
FIG. 1 is a cross section of a sensor, according to one embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

In one embodiment, a sensor is capable of detecting electromagnetic energy. Sensors may include electrodes such as a cathode and anode pair having a suitable work function. In some embodiments, the cathode and anode pair are capable of demonstrating a photoelectric effect. In some embodiments, the sensor detects ultraviolet signals. Other forms of electromagnetic energy, including, but not limited to, infra red light, are detected in various embodiments. Various applications are compatible with the present sensors, including, but not limited to, furnaces having sensors, including burners, boilers, and other types of furnaces. In some embodiments, a sensor is used as a flame detector.

When an electrode sensitive to the reception of a photon is struck by a photon, at least one electron may be unseated from the electrode. The electron then travels to another electrode through plasma conduction. Some embodiments include DC conduction. Additional embodiments include AC conduction. When terminals connected to each electron are monitored, this produces a change in current, in various embodiments. In one embodiment, electrons travel from a cathode to an anode. Such a cycle is not exclusive of the present disclosure, however, and embodiments in which an electron flows from an anode to a cathode are additionally contemplated.

Various embodiments demonstrate an electrode pair which exhibits increased performance when surrounded in an atmosphere which is at a different pressure than Earth atmosphere. Some embodiments have a pressure of approximately 100 torr. Additional pressures are possible. Some sensor embodiments surround the electrode pair in a gas which is of a different composition than that available in Earth atmosphere. Some embodiments include a mix of neon and from about 15% hydrogen to about 20% hydrogen. Other mixtures of gas that provide similar characteristics may be used. Sensors including an electrode pair which is not exposed to Earth atmosphere require a sealed case.

Electromagnetic energy sensors in various embodiments may include a sealed case which has a low cost and a robust design. Various embodiments feature a metallic case enclosing the electrode pair. A metallic case is more robust than a bulb enclosing an electrode pair. Additionally, a metallic case may be easier to manufacture than bulb embodiments. Ease of manufacturing may offer decreased costs to consumers and increased profits for manufactures. Although some embodiments include metallic cases, other conductive cases may also be used. It should be noted that some cases are opaque, and resist passage of photons, and as such, include a window through which photons pass.

During a plasma conduction cycle, electrons are free to travel from the electrode pair to a conductive case. This can happen whether or not the case if floating or grounded. In some embodiments, an insulative barrier discourages the travel of electrons to the conductive case.

FIG. 1 is a cross section of a sensor 100 according to one embodiment. The sensor includes an anode 120 connected to an anode terminal 110. The sensor additionally includes a cathode 122 connected to a cathode terminal 114. In some embodiments, terminals are pin shaped. The anode terminal 110 and the cathode terminal 114 are illustrated as passing through a header 106, but this is only one of the configurations covered by the present disclosure. For example, in some embodiments, one or more terminals could additionally pass through a case 102. In various embodiments, an insulator 108 insulates an anode terminal 110 from the header 106. In additional embodiments, an insulator 112 insulates a cathode terminal 114 from the header 106. Such insulation is used in embodiments in which the header 106 is conductive so that one or more terminals will be electrically insulated from the header 106. In some embodiments, insulators 108, 112 include melted glass grommets. In various embodiments, terminals 110, 114 are coupled to the header 106 physically, but not electrically. Such a configuration physically stabilizes the anode 120 and the cathode 122 with respect to other structures of the sensor.

In various embodiments, the case 102 is sealed to the header 106. In some examples, the seal is hermetic. Embodiments which laser weld the case 102 to the header 106 may be used. Some embodiments include a window 118. The window 118 is hermetically sealed to the case 102 in some configurations. Additional embodiments seal the window 118 to the case 102 using other seals.

The window 118 is adapted to allow for the passage of electromagnetic energy, such as ultraviolet rays. Some embodiments allow for the passage of electromagnetic waves having a wavelength of approximately 250 nanometers. Some embodiments of the window 118 filter out selected electromagnetic waves.

The header 106, the case 102, and the window 118 enclose the anode 120 and the cathode 122. The present subject matter contemplates additional embodiments which enclose the anode 120 and the cathode 122. For example, one or more terminals pass through the case 102 in some embodiments. Embodiments are contemplated which include more or less than the three subcomponents illustrated to enclose the anode 120 and the cathode 122.

The anode 120 and the cathode 122 are enclosed in a controlled atmosphere in various embodiments. In some embodiments, the anode 120 and the cathode 122 are enclosed in an atmosphere which is at a pressure different from that of the atmosphere of Earth. In some embodiments, the atmosphere which encloses anode 120 and cathode 122 is of a different composition than the atmosphere of Earth. Depending on the atmosphere utilized in the sensor, some embodiments incorporate a hermetic seal. Other types of sealing are used for embodiments in which hermeticity is not required.

When a photon strikes the cathode 122, one or more electrons are unseated. These electrons flow to the anode 120, thereby inciting a current between the terminal 110 and the terminal 114. Such a current is monitored, thereby signaling a sensed condition, in various embodiments. Such sensors 100 are often calibrated, but calibration is not required.

A problem exists when one or more electrons from the cathode 122 travel to the case 102. Such a condition exists due to an electrical path between one or more electrodes and the case 102, such as a plasma conduction path. In use, some applications inadvertently ground the case 102. This can disrupt current conduction. A floating case 102 can also disrupt current conduction. Such disruptions can alter the operation of the sensor 100. In some applications, the calibration of the sensor 100 is disturbed. The fidelity of the sensor 100 is upset in some applications. Other operational requirements can be interfered with when the case receives one or more electrons from cathode 122.

To reduce this effect, an insulator 104 disrupts electron flow from electrodes to the case 102. The insulator 104 can be cylindrical, but other shapes are possible. Some embodiments include an insulator 104 which is sleeve shaped. In various embodiments, the insulator 104 is disposed around the anode 120 and the cathode 122. In various embodiments the insulator 104 does not touch the anode 120 and the cathode 122, but other configurations are possible.

In one embodiment, the insulator 104 is a sleeve 104 which fits inside the case 102. In some embodiments, the insulator 104 extends from the header 106 to the top of the case 102, and is secured inside the sensor 100 when the case 102 is coupled with the header 106. In some embodiments, the sleeve 104 has a form factor which is substantially mated to the form factor of the interior of the case 102. This is not an exclusive configuration, however, and additional insulator embodiments which are disposed between an electrode and the case 102 are contemplated. For example, a band surrounding anode and cathode and limiting electron paths to case 102 may be used. Some embodiments do not put the insulator 104 in contact with the header 106. Additional embodiments do not put the insulator 104 in contact with the top of case 102.

Various materials may be used for the insulator 104, including, but not limited to, quartz, PYREX, and/or alumina. This list of materials is not exhaustive or exclusive, and other insulators are possible without departing from the present subject matter. Some embodiments coat the terminals 110 and 114 with a photon transmissive dielectric to additionally discourage plasma conduction from these components to header 106. Such coatings are optional, and some embodiments do not include them.

Additionally illustrated is an optional anodic terminal insulator 124 which encases terminal 110 between anode 120 and header 106. Also illustrated is an optional cathodic terminal insulator 126 which encases terminal 114 between cathode 122 and header 106. Various embodiments benefit from an increase in parasitic capacitance between one or both of the anode 120 and the cathode 122, and associated conductors, such as terminals 110 and 114, and case 102. In various embodiments, if such a parasitic capacitance is higher than the capacitance between the anode 120 and the cathode 122, breakdown will occur between anode 120 and cathode 122, which is preferred. In some embodiments, if the capacitance between one or both of the anode 120 and the cathode 122 and the case 102 is lower than the capacitance between one or both of the anode 120 and the cathode 122, breakdown will initiate between one or both of the anode 120 and the cathode 122 and the case. To address such a phenomenon, various embodiments include one or more of optional anodic insulator 124 for terminal 110, and an optional cathodic insulator 126 for terminal 114. Various embodiments include a terminal insulator which includes a dielectric. Some embodiments feature an terminal insulator including $TiO_2$. Some embodiments feature an terminal insulator including $SiO_2$.

Figure 2A:
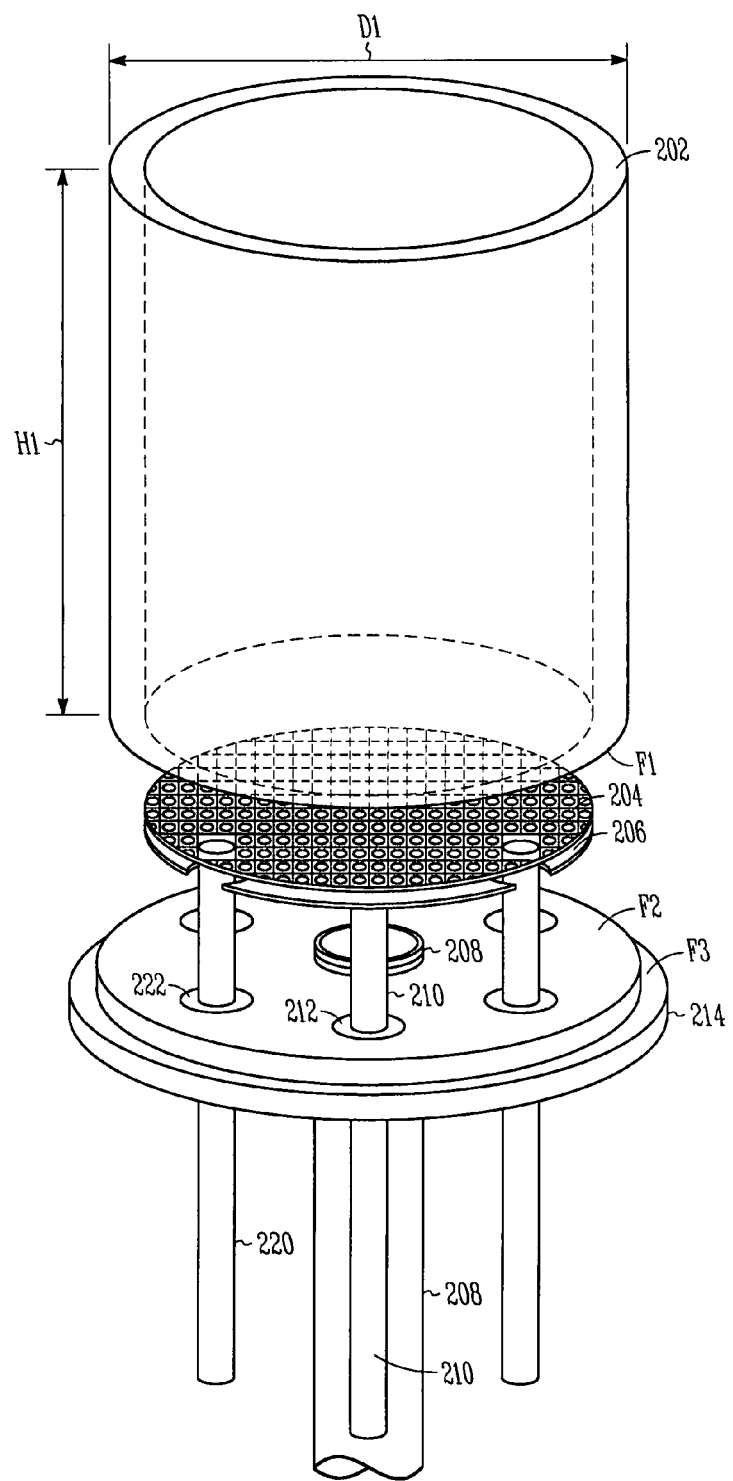
FIG. 2A is a perspective, partially exploded view of a sensor, according to one embodiment.
Figure 2B:
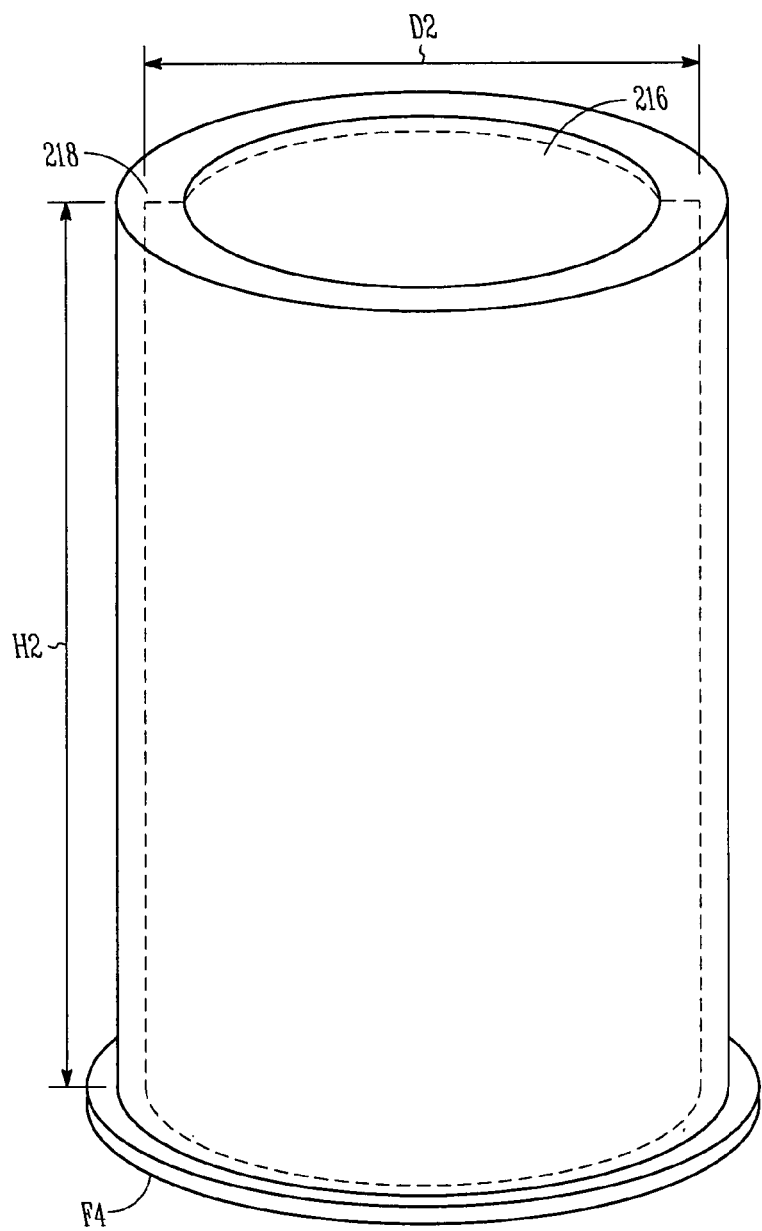
FIG. 2B is a case for a sensor, according to an embodiment.

FIGS. 2A-2B show a perspective, partially exploded view of a sensor according to one embodiment. A case 218 includes a window 216. The window 216 is adapted to allow passage of ultraviolet photons, in various embodiments. A header 214 can be made of various materials including, but not limited to, steel, titanium and stainless steel. In various embodiments, the header 214 is sealed to the case 218 with a weld. In various embodiments, the weld occurs along the junction of the header lip face F3 and the case flange face F4, but other configurations are contemplated. In some embodiments in which the header 214 and the case 218 are welded together, no filler material is used. For example, some embodiments laser weld the case 218 to the header 214. Additional embodiments use a filler metal. Additional embodiments use other joining methods. For example, in some embodiments, the case 218 is threaded onto the header 214. Various seals are contemplated including, but not limited to, polymer seals (including rubbers seals), o-ring style seals and adhesives. These seals are not an exhaustive or exclusive list of seals, and other seals are contemplated Enclosed by the case 218 and the header 214 are an anode 204 and a cathode 206. In embodiments where the header 214 is conductive, insulators 212, 222 electrically insulate the terminals 210, 220 from the header 214, respectively. In various embodiments, the insulators are melted glass grommets. The illustration shows three terminals supporting the anode, and three terminals supporting the cathode. In additional embodiments, other numbers of terminals are used to support the anode. Some embodiments additionally use other numbers of terminals to support the cathode.

In various embodiments, the anode 204 is substantially planar and includes a plurality of openings. Additional embodiments include anodes having different shapes. Anodes having openings shaped differently than the illustrated openings are contemplated. Anode materials contemplated are those used in anode cathode devices sensitive to the reception of electromagnetic waves. Specifically, some embodiments include anode cathode devices which produce a photoelectric effect. More than one anode layer is possible. A stack of electrodes is used, in some embodiments. In some stacks, adjacent anode layers abut. In other stacks, adjacent anode layers are separated by a distance. Some embodiments space multiple anode layers to improve the reception of free electrons traveling from a cathode.

In various embodiments, the cathode 206 is substantially planar and is substantially solid. Additional embodiments include cathodes having different shapes. Cathodes which are not solid, including various openings, are contemplated. Cathode materials contemplated are those used in cathode anode devices sensitive to the reception of electromagnetic waves. More than one cathode layer is possible. A stack of electrodes is used, in some embodiments. In some stacks, adjacent anode layers abut. In other stacks, adjacent anode layers are separated by a distance. Some embodiments space multiple cathode layers to improve the emission of free electrons traveling to an anode.

In various embodiments, the distance between the anode and the cathode is selected to encourage plasma conduction of electrons. In some embodiments, the distance between the anode and the cathode is from approximately 0.020 inches to approximately 0.024 inches. In some embodiments, the distance is approximately 0.024 inches. These dimensions are not exclusive or exhaustive of the present subject matter, however. In various embodiments, the distance between a terminal of the anode and the cathode is at least 0.020 inches. In various embodiments, the distance between the cathode 206 and the header 214 is more than 0.020 inches. Other dimensions are selected depending on application variations, sensor material variations and other design criteria.

The illustration includes a fill tube 208. The fill tube 208 is suitable for transmitting gas to a chamber defined by the header 214 when it is sealed to the case 218. Other fill tube configurations known to allow for transmission of gas to a chamber are contemplated. In various embodiments, the fill tube 208 is hermetically sealed to the header 214. In additional embodiments, the fill tube 208 is itself hermetically sealed. In various embodiments, gas is disposed in a sensor by commuting the gas through the fill tube 208. In some embodiments, gas is sealed into the sensor by sealing the fill tube 208. Sealing processes for the fill tube 208 include, but are not limited to, welding and crimping.

The insulative sleeve 202 is a dielectric and resists the plasma transmission of electrons from one or both of the electrodes 204, 206 to the case 218. The insulative sleeve 202 includes an inner diameter D1 which is sized to mate an outer diameter D2. Various embodiments mate inner diameter D1 to outer diameter D2 with a non-interference fit, however other fits are contemplated. In some embodiments, an insulative sleeve 202 abuts the case 218. The sleeve 202 has a height H1 in the illustrated configuration. Height H1 is sized to match the height H2 of the case 218 in various embodiments. Such a fit has a close, non-interference tolerance, in various embodiments. This is to prevent movement of the sleeve in a sensor in application. This additionally helps to prevent plasma conduction of electrons. In various embodiments, the sleeve 202 includes a sleeve face F1 which is sized for placement adjacent a header face F2. Additional configurations are contemplated. For example, some embodiments do not place the sleeve 202 adjacent the header 214.

Figure 3:
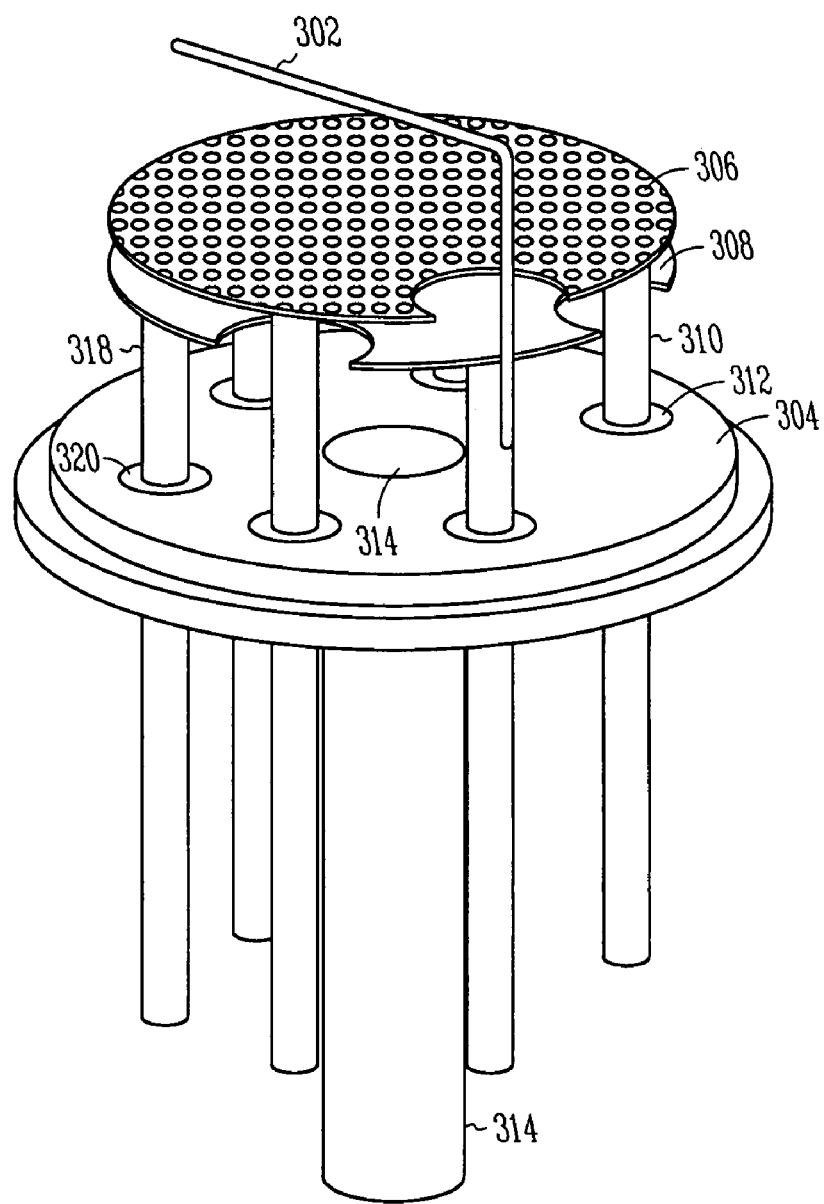
FIG. 3 is a perspective view of a partial sensor having a cathode loop, according to one embodiment.

FIG. 3 is a perspective view of a partial sensor having a cathode loop 302, according to one embodiment. Cathode loop 302 is useful, in part, to collect free radical particles which are not collected during a cathode 308 to anode 306 plasma cycle. Also visible are a header 304, insulators 312, 320, a fill port 314, and terminals 310, 318. In various embodiments, a substantially planar anode is disposed substantially parallel to header 304. In some of these embodiments, a substantially planar cathode is disposed between the substantially planar anode and the header, and is substantially planar to the header. Some of these embodiments position a cathode loop such that the substantially planar anode and the substantially planar cathode are disposed between the cathode loop and the header.

Figure 4:
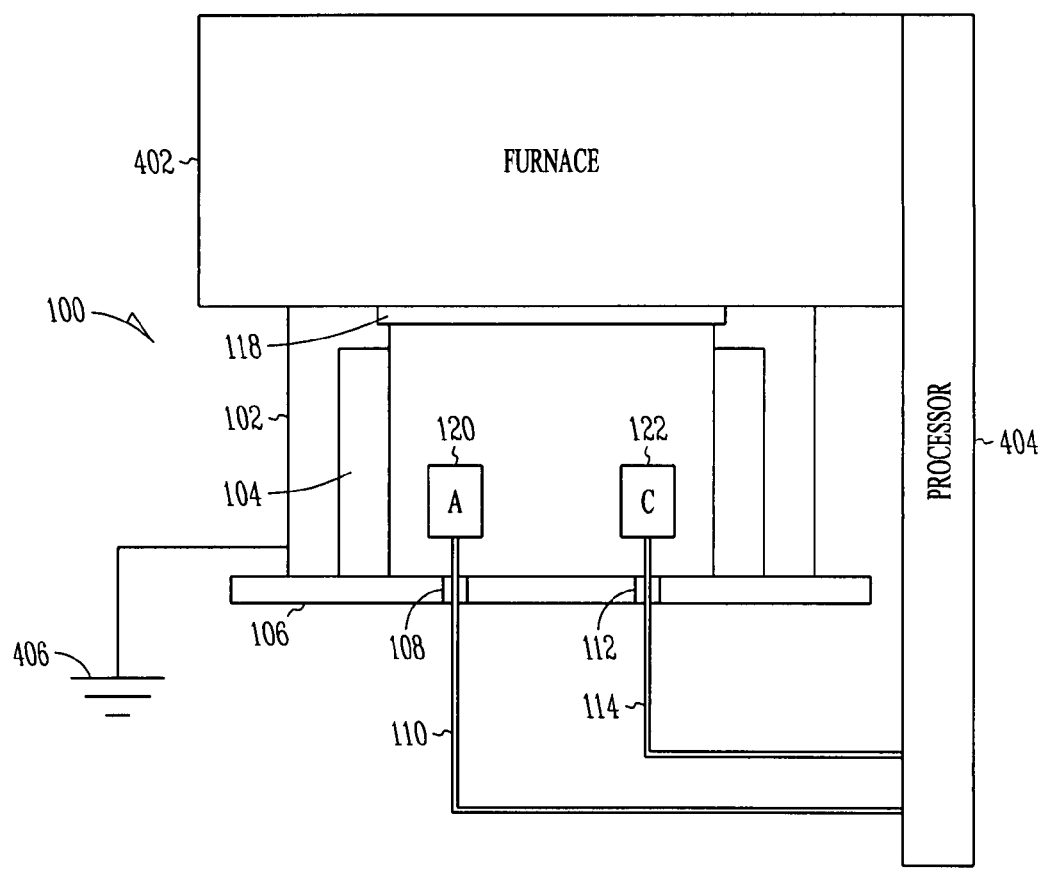
FIG. 4 is a system includes a sensor, according to one embodiment.

FIG. 4 is a system that includes a sensor, according to one embodiment. The sensor 100 from FIG. 1 is included in this system, and like numerals from FIG. 1 also reference features in the present figure. Also illustrated are furnace 402, a processor 404, and a ground 406. In various embodiments, sensor 100 is used in a control system for a furnace 402. In some embodiments, it is used in an open-loop (non-feedback) relationship to relay data to a user. In additional embodiments, a processor 404 collects signal information from the sensor 100 and uses it to adjust the furnace 402 in a feedback relationship. An example control system might incorporate a thermostat which is used to adjust the temperature of furnace 402 based on information collected from a signal of the sensor 100. Analog control electronics are contemplated, as are digital control electronics. Software is used to control processor 404, in various embodiments. Furnaces contemplated herein include, but are not limited to, burners and/or boilers.

In various embodiments, the ground 406 is part of an electronics module in which the terminals 110 and 114 are connected to electronics. Configurations in which the ground is otherwise achieved are contemplated. For example, some embodiments connect ground 406 to a ground external to an electronics module in which terminals 110 and 114 are connected to electronics. Embodiments not grounding the case 102 and allowing it to float are also contemplated.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. An electromagnetic sensor, comprising:
   a header;
   an anode connected to a first terminal, the anode in electrical isolation from the header;
   a cathode connected to a second terminal, the cathode in electrical isolation from the header;
   a conductive case including a window transparent to electromagnetic energy, the conductive case enclosing the anode and the cathode and hermetically sealed to the header; and
   an insulative sleeve disposed between the cathode and the conductive case and further disposed between the anode and the conductive case,
   wherein the first terminal and the second terminal extend outside the conductive case.

2. The electromagnetic sensor of claim 1, further comprising a header, wherein the first terminal extends through the header and the second terminal extends through the header.

3. The electromagnetic sensor of claim 1, wherein the sleeve includes quartz.

4. The electromagnetic sensor of claim 1, wherein the window is ultraviolet transparent.

5. The electromagnetic sensor of claim 1, further comprising a first terminal insulator substantially encasing first terminal between the anode and the header, and a second terminal insulator substantially encasing the second terminal between the cathode and the header.

6. The electromagnetic sensor of claim 1, wherein the electromagnetic sensor is an ultraviolet detector.

7. The electromagnetic sensor of claim 6, wherein the ultraviolet detector is a flame detector.

8. The electromagnetic sensor of claim 1, wherein the case has an interior surface having a form factor to which the sleeve is sized to fit such that the sleeve is sandwiched between the case and the header and substantially restricted from movement.

9. The electromagnetic sensor of claim 7, wherein the case and the sleeve are substantially cylindrical.

10. The electromagnetic sensor of claim 1, further comprising a gas fill tube hermetically sealed to the header, the gas fill tube being hermetically sealed.

11. The electromagnetic sensor of claim 10, further comprising gas in a chamber defined by the header and the case at a pressure less than one atmosphere ("atm").

12. The electromagnetic sensor of claim 1, wherein the insulative sleeve is AC insulative and DC insulative.

13. The sensor of claim 1, wherein the sleeve includes PYREX.

14. A system, comprising:
an electromagnetic sensor, comprising:
a header which is substantially planar;
a cathode which is substantially planar and which is connected to a first terminal, the first terminal extending through the header and coupled to the header in substantial electrical isolation such that the cathode is substantially parallel to the header;
a substantially planar anode connected to a second terminal, the second terminal extending through the header and coupled to the header in substantial electrical isolation such that the anode is substantially parallel to the header;
a case enclosing the anode and the cathode and hermetically sealed to the substantially planar header;
an insulative sleeve disposed between the anode and the case and between the cathode and the case;
a furnace, with the electromagnetic sensor being disposed in the furnace; and
a processor adapted to control the furnace and to receive data from the electromagnetic sensor,
wherein the case is connected to a ground.

15. The system of claim 14, wherein the furnace includes a burner.

16. The system of claim 14, wherein the cathode is positioned between the anode and the header.

17. The system of claim 16, further comprising a cathode loop in electrical communication with the cathode and extending to a space on a first side of the anode, with the cathode being disposed on a second side of the anode, the second side being opposed to the first side.

18. An apparatus, comprising:
a header;
a cathode connected to at least a first terminal extending through the header and in electrical isolation from the header;
means for providing an anode for the cathode;
means for sealingly enclosing the cathode and the means for providing an anode for the cathode; and
means for electrically isolating plasma conduction between the cathode and the means for sealingly enclosing the cathode and the means for providing an anode for the cathode, and for electrically isolating plasma conduction between the means for providing an anode for the cathode and the means for sealingly enclosing the cathode and the means for providing an anode for the cathode, wherein the means for electrically isolating plasma conduction between the case means and the cathode and the means for sealingly enclosing the cathode and the means for providing an anode for the cathode include a sleeve disposed between the anode and the case and the cathode and the case.

19. The apparatus of claim 18, wherein the means for providing an anode for the cathode additionally includes means for allowing photons to pass through to the cathode.

20. An electromagnetic sensor, comprising:
a header;
an anode connected to a first terminal, the anode in electrical isolation from the header;
a cathode connected to a second terminal, the cathode in electrical isolation from the header;
a conductive case including a window transparent to electromagnetic energy, the conductive case enclosing the anode and the cathode and hermetically sealed to the header; and
an insulative sleeve disposed between the cathode and the conductive case and further disposed between the anode and the conductive case,
wherein the first terminal and the second terminal extend outside the conductive case and wherein the case has an interior surface having a form factor to which the sleeve is sized to fit such that the sleeve is sandwiched between the case and the header and substantially restricted from movement.

* * * * *